Jan. 2, 1968            J. DAVIS            3,361,514
FOLDING EYEGLASS ASSEMBLY WITH EXTENSIBLE BOW
MEMBERS FOR GRIPPING WEARER'S HEAD
Filed April 2, 1964            2 Sheets-Sheet 1
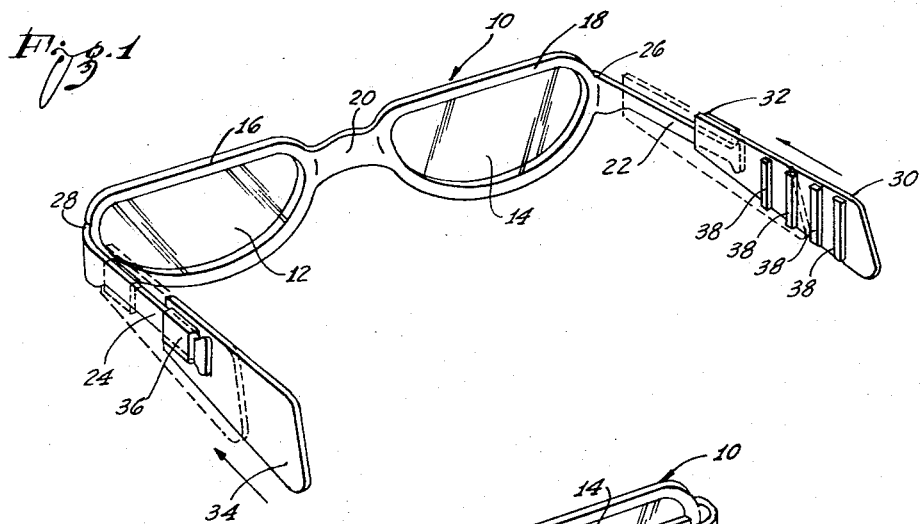
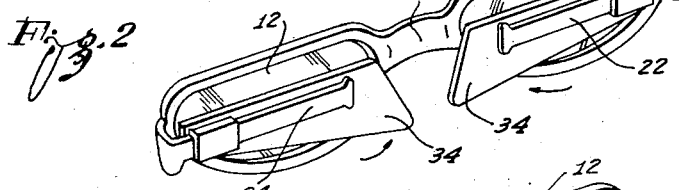
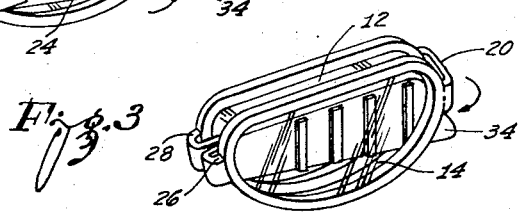
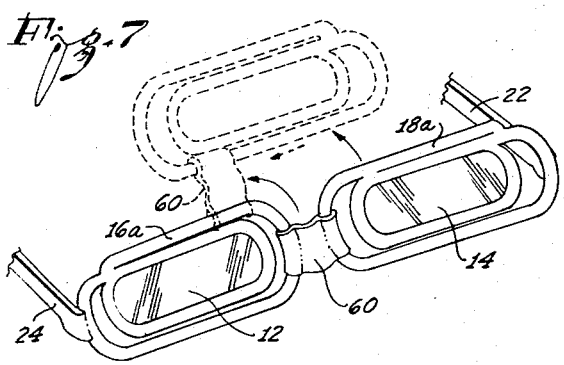
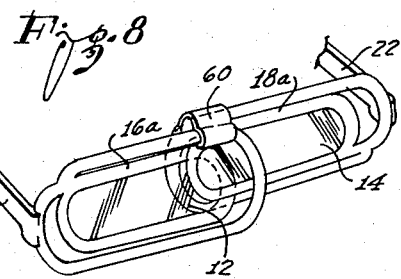
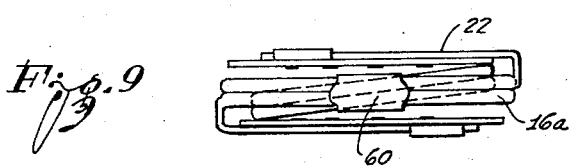
INVENTOR:
Jeannette Davis
By Keith D. Beecher
Attorney

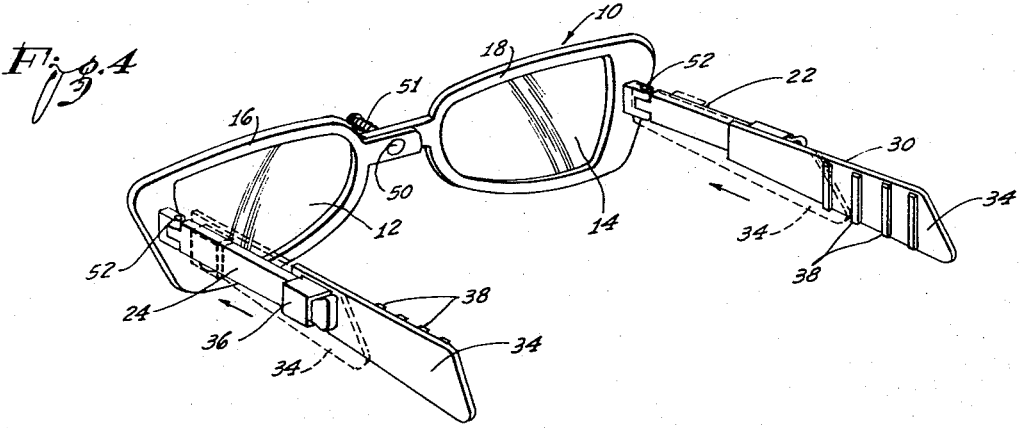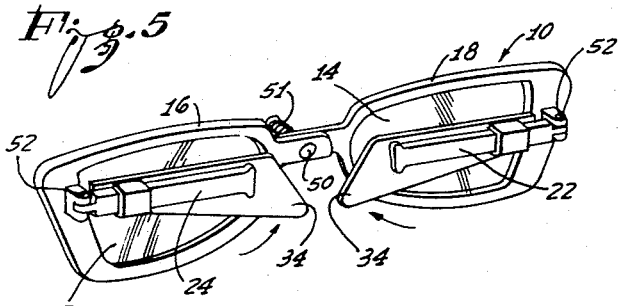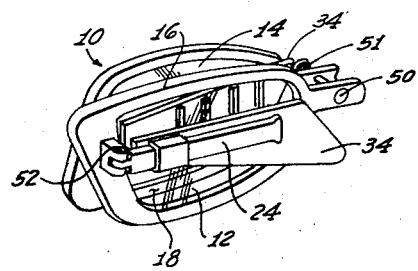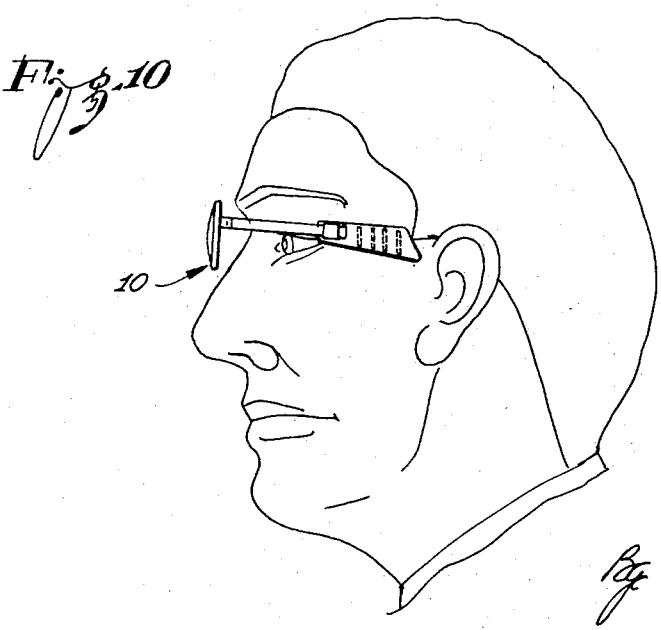

United States Patent Office 3,361,514
Patented Jan. 2, 1968

3,361,514
FOLDING EYEGLASS ASSEMBLY WITH EXTENSIBLE BOW MEMBERS FOR GRIPPING WEARER'S HEAD
Jeannette Davis, 1211 Selby Ave., Apt. 10, West Los Angeles, Calif. 90024
Filed Apr. 2, 1964, Ser. No. 356,919
1 Claim. (Cl. 351—63)

ABSTRACT OF THE DISCLOSURE

An improved construction for a pair of spectacles is described in the following specification. The spectacles are composed of plastic, and may be folded into a compact configuration when not in use. This is achieved by providing a resilient hinge means between the lenses, and also by providing extensible bows of a particular construction. The spectacles are constructed so that the bows, when extended, engage the side of the wearer's head, and there is no need to support the spectacles on the nose of the wearer.

---

The present invention relates to spectacles, or eyeglasses, and it relates more particularly to an improved eyeglass construction of the same general type as disclosed, for example, in United States Patent 3,006,247, Oct. 31, 1961.

The spectacles of the present invention are light in weight and may be supported when worn so as to be out of contact with the bridge of the wearer's nose. Moreover, the spectacles may be folded into a compact unit, when not in use.

As is well known, the usual eyeglass includes a pair of lenses, a frame for holding the lenses in position, and a pair of bows. The bows are hinged to the frame, and they usually curl over the ears of the wearer.

Most prior art spectacles, or glasses, as mentioned in the patent, are relatively heavy, and they are constructed so that the weight of the assembly is borne by the nose of the wearer. This method of support is often uncomfortable, especially after long intervals of wear, and it also tends to disfigure the bridge of the nose.

The present invention, as mentioned, provides improved eyeglasses which, like the eyeglasses of the above-mentioned patent, are relatively light, and are supported in a manner such that they are displaced from the nose.

Eyeglasses constructed in accordance with the concepts of the present invention, as was the case with the eyeglasses disclosed in the aforesaid patent, may be worn for long intervals of time without producing discomforture and without disfiguring the bridge of the wearer's nose.

A particular advantage of the improved eyeglasses of the present invention is that they may be folded over when not in use into a compact configuration. This may be achieved, as will be described, by providing a hinged link in the frame and by providing the bows with an extensible portion. The extensible portion of each bow may be retracted when the glasses are not in use, so as to facilitate the folding over of the glasses into a compact unit.

An object of the invention, therefore, is to provide improved spectacles, or eyeglasses, which are relatively light and which may be comfortably worn for long intervals.

Yet another object of the invention is to provide such improved spectacles, or eyeglasses, which are relatively simple and inexpensive to construct and which may be sold at a relatively low price.

A still further object of the invention is to provide such improved spectacles, or eyeglasses, which may be configured into a compact unit when the eyeglasses are not in use, so that they may be conveniently placed in a small receptacle, or the like.

A feature of the invention, as mentioned above, is the provision of improved eyeglasses which may be firmly supported in place over the eyes of the wearer when in use, and which are held so as to be out of all contact with the bridge of the wearer's nose, the improved eyeglasses being constructed so that they may be readily folded into a compact unit, as will be described.

Other objects, features and advantages of the invention will become apparent from a consideration of the following description, when the description is taken in conjunction with the accompanying drawing in which:

FIGURE 1 is a perspective view of one embodiment of the invention, this view showing a pair of spectacles constructed in accordance with the invention, and in open condition and ready for use;

FIGURE 2 is a perspective view of the spectacles of FIGURE 1, showing the assembly in a partially folded condition, prior to being placed in a suitable receptacle, when not in use;

FIGURE 3 shows the spectacles of FIGURE 1 in a completely folded condition, for storage when not in use;

FIGURE 4 is a perspective view of a second embodiment of the invention, the illustrated spectacles of FIGURE 4 being open and ready for use;

FIGURE 5 is a partially folded view of the spectacles of FIGURE 4;

FIGURE 6 is a fully folded view of the spectacles of FIGURE 4;

FIGURE 7 is a front perspective view of a further embodiment of the invention;

FIGURES 8 and 9 are views of the embodiment of FIGURE 1, showing the manner in which the latter embodiment may be folded into a compact unit; and FIGURE 10 is a representation of the manner in which the spectacles of the present invention may be worn so as to be completely displaced from the nose of the wearer.

The embodiment of FIGURE 1 includes a frame 10 which may be composed of a suitable relatively light plastic material. A pair of lenses 12 and 14 are supported in the frame 10.

In the embodiment of FIGURE 1, the frame 10 includes a first portion 16 and a second portion 18. The portion 16 supports the lens 12, and the portion 18 supports the lens 14. The portions 16 and 18 are inter-coupled by a suitable hinge means. This hinge means may be an integral strip 20 which is composed of a resilient plastic material, or it may be any other suitable hinge structure.

In the embodiment of FIGURE 1, a pair of bows 22 and 24 are attached to the respective ends of the frame 10. These bows may be composed of the same plastic material as the frame 10, and they are attached to the frame by respective hinges 26 and 28. These hinges may be formed of a resilient plastic material, which is integral with the frame 10 and the bow 22, insofar as the hinge 26 is concerned; and which is integral with the frame 10 and the bow 24, insofar as the hinge 28 is concerned.

An extensible portion 30 is coupled to the bow 22 by means, for example, of a boss-like member 32. The boss-like member 32 is hollow, and it is slidably mounted on the bow 22. The end of the bow 22 is enlarged, so as to prevent the member 32 from sliding off the end of the bow 22.

A similar member 34 is slidably mounted on the bow 24 by means of a boss-like member 36. The member 34 forms an extensible portion for the bow 24.

The extensible members 30 and 34 have a plurality of ribs, such as the ribs 38 formed on their inner surfaces. These ribs are intended to bear against the sides of the head of the wearer, when the glasses are in place, and assist in holding the assembly firmly on the wearer and out of contact with his nose.

The construction is such that when the spectacles are open, and when the extensible portions 30 and 34 are extended, as shown in FIGURE 1, the assembly may be placed on the head of the wearer, such as shown in FIGURE 10. The resilient hinges 20, 26 and 28 are formed so as to cause the portions 30 and 34 to bear inwardly against the temples of the wearer.

The above described construction permits the assembly to be worn, in the manner shown in FIGURE 10, with the frame 10 completely displaced from the nose of the wearer. As described in the aforementioned patent, this enables the assembly to be worn for long intervals of time without discomforture, and without disfiguring the wearer's nose.

When it is desired to remove the glasses and place them in the appropriate receptacle, so as to be carried in the purse or pocket, the extensible members 30 and 34 are moved to their retracted position on the bows 24 and 22, as shown in FIGURE 2. The bows are then folded inwardly, as shown in FIGURE 2.

Finally, in order to form a compact unit, the entire assembly is again folded about tthe central hinge 20, as shown in FIGURE 3.

The embodiment of FIGURES 4, 5 and 6 is similar in some respects to the embodiment of FIGURES 1-3, and similar components are designated by the same numbers.

In the embodiment of FIGURE 4, the two frame portions 16 and 18 are hinged together by means, for example, of a pin 50 spring loaded by a spring 51. The pin 50 extends along an axis perpendicular to the plane of the frame portions 16 and 18. The bows 22 and 24 may be attached to the frame portions 16 and 18 in the manner described in conjunction with FIGURE 1, or usual hinges, such as the hinge 52 may be utilized.

As shown in FIGURES 5 and 6, the embodiment of FIGURE 4 is folded into a compact unit, by first folding over the bows 22 and 24 (FIGURE 5), and then by shifting the frame portions 16 and 18 out of their common plane to an offset position against the spring 51, and then by turning them about the axis of the pin 50, until one of the frame portions is folded over the other (FIGURE 6).

In the embodiment of FIGURES 7-9, the two lenses 12 and 14 are supported in a corresponding pair of frame portions 16a and 18a. These frame portions are intercoupled by a link 60 which may, for example, be formed of plastic material. When the link 60 is in the position shown in FIGURE 7, it permits angular movement of the frame portions 16a and 18a in a direction into the plane of the paper. However, the link is configured to include stops so as to inhibit angular movement of the frame portions in the opposite direction out of the plane of the paper.

This latter embodiment may include bow assemblies, such as the bow assemblies discussed above; and the stops configured in the link 60 cause these bow assemblies to be biased against the head of the wearer, so that the ribs 38 may bear against his temples and permit the assembly to be worn in the manner shown in FIGURE 10.

The frame portions 16 and 18 of the latter embodiment have a tubular configuration, such as shown in FIGURES 7 and 8, and the link 60 is constructed so that it may slide along the frame portions, as shown in FIGURES 7 and 8.

When it is desired to fold the assembly of FIGURE 7 into the compact unit of FIGURE 9, the frame 18a is moved, together with the link 60, so that these two components have the position shown by the dotted lines in FIGURE 7. Then, the frame portion 18a is folded back of the frame portion 16a, as shown in FIGURE 8. The bow assemblies may then be moved to their retracted position, and folded inwardly. Then, the frame portion 16a is moved into engaging relationship with the frame portion 18a, so that the assembly forms the compact unit of FIGURE 9.

It will be appreciated that the spectacle assemblies described above, in their various embodiments is most advantageous in that they can be worn comfortably, as described. Moreover, when it is desired to remove the assembly, it may be folded into a compact unit. This permits the resulting unit conveniently to be placed in a simple small receptacle, so as to be carried in the purse or pocket.

While particular embodiments of the invention have been shown and described, modifications may be made. It is intended in the following claim to cover all modifications which fall within the scope of the invention.

What is claimed is:

1. An eyeglass assembly adapted to be worn displaced from the nose of the wearer, said assembly including: a frame composed of light plastic material and including a first portion and a second portion intercoupled by a resilient intermediate portion integral with said first portion and said second portion, said intermediate portion serving as a hinge means for said first portion and second portion; first and second lenses respectively supported in said first and second portions; a pair of short bows of said light plastic material integral with the respective ends of said frame and attached thereto by respective resilient portions formed by said plastic material and providing respective first and second hinges therefor; a first strip-like extensible bow member including an integral hollow boss-like member slidably receiving one of the aforesaid bows; and a second strip-like extensible bow member including an integral hollow boss-like member slidably receiving the other of the aforesaid bows, said integral bows each having an enlarged end to retain the corresponding one of said boss members thereon, said first and second extensible bow members being slidably disposed on the inner sides of their respective bows and having enlarged flat outer end portions engaging the head of the wearer forwardly of the ears when fully extended, the flat outer end portions of said first and second bow members each having a plurality of parallel transverse integral ribs of generally rectangular cross-section formed on the inner surface thereof to assist in holding the assembly firmly on the wearer; said hinge means and said first and second hinges exerting forces on said bows so as to cause said first and second bow members, when extended, to bear against the head of the wearer so as to support the eyeglass assembly out of contact with the wearer's nose.

References Cited

UNITED STATES PATENTS

| | | | |
|---|---|---|---|
| 266,436 | 10/1882 | Crawford | 351—63 |
| 1,572,733 | 2/1926 | McCourt. | |
| 2,419,303 | 4/1947 | Vasey | 351—63 |
| 2,746,087 | 5/1956 | Dolezal | 351—177 X |
| 2,975,426 | 3/1961 | Rabb | 351—63 X |
| 3,155,982 | 11/1964 | Baratelli | 351—123 X |

FOREIGN PATENTS

| | | |
|---|---|---|
| 1,374 | 1892 | Great Britain. |
| 9,815 | 1899 | Great Britain. |
| 297,472 | 6/1954 | Switzerland. |

DAVID H. RUBIN, Primary Examiner.

FREDERICK M. STRADER, Examiner.